US010817329B1

(12) United States Patent
Kim

(10) Patent No.: US 10,817,329 B1
(45) Date of Patent: Oct. 27, 2020

(54) SYSTEMS AND METHODS FOR CENTRALIZATION AND DIAGNOSTICS FOR LIVE VIRTUAL SERVER PERFORMANCE DATA

(71) Applicant: Coupang Corp., Seoul (KR)

(72) Inventor: Tae Kyung Kim, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/784,333

(22) Filed: Feb. 7, 2020

(51) Int. Cl.
G06F 9/46 (2006.01)
G06F 9/455 (2018.01)
G06F 3/0481 (2013.01)
G06F 9/50 (2006.01)
G06F 16/9538 (2019.01)

(52) U.S. Cl.
CPC ........ G06F 9/45558 (2013.01); G06F 3/0481 (2013.01); G06F 9/505 (2013.01); G06F 9/5077 (2013.01); G06F 16/9538 (2019.01); G06F 2009/45591 (2013.01)

(58) Field of Classification Search
CPC . G06F 9/45558; G06F 16/9538; G06F 3/0481
See application file for complete search history.

(56) References Cited

U.S. PATENT DOCUMENTS 9,229,611 B2 * 1/2016 Smiljanic ............... G06F 3/0481
2013/0117716 A1 * 5/2013 Stevens ................ G06F 16/954
715/841

OTHER PUBLICATIONS

Mitch Garnaat, GitHub Repository for Skew Programming Library, https://github.com/scopely-devops/skew, Mar. 31, 2019 (4 pages).

* cited by examiner

Primary Examiner — Camquy Truong
(74) Attorney, Agent, or Firm — Finnegan, Henderson, Farabow, Garrett & Dunner LLP

(57) ABSTRACT

Methods and systems for diagnosis of live virtual server performance data are disclosed. In one embodiment, an exemplary method comprises receiving a request to assign a first role to at least one virtual server; configuring the virtual server to associate the first role with a first resource of the virtual server; modifying a database to include an identifier associated with the virtual server and an identifier of the first role assigned to the virtual server; receiving indications of first resource usage; mapping the first resource usage to the first role; storing the indications of first resource usage; associating a change in first resource usage with a corresponding first resource operation; modifying a user interface element for presentation on a web page to include the first resource usage; receiving a request for the web page from a user; and delivering the web page to a user interface.

20 Claims, 3 Drawing Sheets

|  |  | Sales | | Research & Development |
|---|---|---|---|---|
|  |  | Web Hosting | Email Archives | Neural Network Training |
| Virtual Server A | Processor A | ✓ |  | ✓ |
|  | Storage A | ✓ | ✓ |  |
|  | Connectivity A |  |  |  |
| Virtual Server B | Processor B |  |  | ✓ |
|  | Storage B |  | ✓ |  |
|  | Connectivity B | ✓ |  |  |
| Virtual Server C | Processor C | ✓ |  | ✓ |
|  | Storage C | ✓ | ✓ |  |
|  | Connectivity C |  |  |  |

FIG. 3

SYSTEMS AND METHODS FOR CENTRALIZATION AND DIAGNOSTICS FOR LIVE VIRTUAL SERVER PERFORMANCE DATA

TECHNICAL FIELD

The present disclosure generally relates to computerized systems and methods for centralizing and diagnosing live virtual server performance data. In particular, embodiments of the present disclosure relate to a system that receives a request to assign a processing, storage, or communication role to a virtual server. The system configures the virtual server to associate the role with a resource of the virtual server and records resource usage associated and operations associated with a role. The resource usage is tracked and mapped to resource operations. In this way, a single configuration management database may quickly track performance variations and determine operations which may cause the performance variation, thus aiding efficient diagnosis and mitigation of virtual server performance issues.

BACKGROUND

Proliferation of virtual servers has broadened access to large computing resources at low costs. Various corporations provide virtual server resources, also known as cloud computing. Further, companies, universities, and government organizations utilize virtual servers to host websites, perform complex computer simulations, and store large databases, among other services. Virtual servers provide secure, reliable, and scalable computational resources to clients, enabling clients to focus on creating products rather than maintaining server capability.

However, complex organizations consuming large amounts of virtual server resources often have difficulty tracking virtual server performance or efficiency. For instance, a large company may have many different operations, each requiring different virtual server resources. A management department may require storage on a virtual server, while research and development require processing for computational modeling, and a sales department may need a virtual server to host a web site.

Further, many different operations within an organization consume the same resources. A customer service chat and an online store may both require a virtual server hosting a website. Alternatively, a computer science department at a university may require processing power for various computational studies, such as training a machine learning algorithm and performing Monte Carlo simulations. However, virtual server providers often only report the aggregated usage or each resource, or the total usage of an individual virtual server. This makes it difficult for complex organizations to measure the efficiency of employed virtual servers in real time. An organization may be unable to determine what causes a virtual server to perform poorly, and pay unnecessary costs due to roles which waste resources. This could lead to wasted organizational resources, requiring significant time and money to diagnose issues with individual roles on a virtual server.

Accordingly, there is a need for systems and methods to centralize and diagnose live virtual server performance data within an organization that requires virtual server resources.

SUMMARY

One aspect of the present disclosure is directed to a computer-implemented system for diagnosis of live virtual server performance data. The system comprises a memory storing instructions and at least one processor configured to execute the instructions to: receive a request to assign a first role to at least one virtual server; configure the virtual server to associate the first role with a first resource of the virtual server; modify a database to include an identifier associated with the virtual server and an identifier of the first role assigned to the virtual server; receive, from the virtual server, indications of first resource usage; map the first resource usage to the first role; store, in a data store, the indications of first resource usage; associate a change in first resource usage with a corresponding first resource operation; modify a user interface element for presentation on a web page to include the first resource usage mapped to the first role and the first resource operation; receive a request for the web page from a user; and deliver the web page to a user interface for display.

Another aspect of the present disclosure is directed to a computer-implemented method for diagnosis of live virtual server performance data. The method includes the steps of: receiving a request to assign a first role to at least one virtual server; configuring the virtual server to associate the first role with a first resource of the virtual server; modifying a database to include an identifier associated with the virtual server and an identifier of the first role assigned to the virtual server; receiving, from the virtual server, indications of first resource usage; mapping the first resource usage to the first role; storing, in a data store, the indications of first resource usage; associating a change in first resource usage with a corresponding first resource operation; modifying a user interface element for presentation on a web page to include the first resource usage mapped to the first role and the first resource operation; receiving a request for the web page from a user; and delivering the web page to a user interface for display.

Another aspect of the present disclosure is directed to a computer-implemented system for diagnosis of live virtual server performance data. The system comprises a memory storing instructions and at least one processor configured to execute the instructions to: receive a request to assign a first role to at least one virtual server; configure the virtual server to associate the first role with a storage of the virtual server; modify a database to include an identifier associated with the virtual server and an identifier of the first role assigned to the virtual server; receive, from the virtual server, indications of storage usage; map the storage usage to the first role; store, in a data store, the indications of storage usage; determine that the indications of storage usage indicate exceeding of a threshold, and responsive thereto, configure an additional storage to augment the storage of the virtual server; associate a change in storage usage with a corresponding storage operation; modify a user interface element for presentation on a web page to include the storage usage mapped to the first role and the storage operation; receive a request for the web page from a user; and deliver the web page to a user interface for display Other systems, methods, and computer-readable media are also discussed herein.

BRIEF DESCRIPTION OF THE DRAWINGS

FIG. 3 illustrates associations of roles and resources of multiple virtual servers, consistent with the disclosed embodiments.

DETAILED DESCRIPTION

Figure 1:
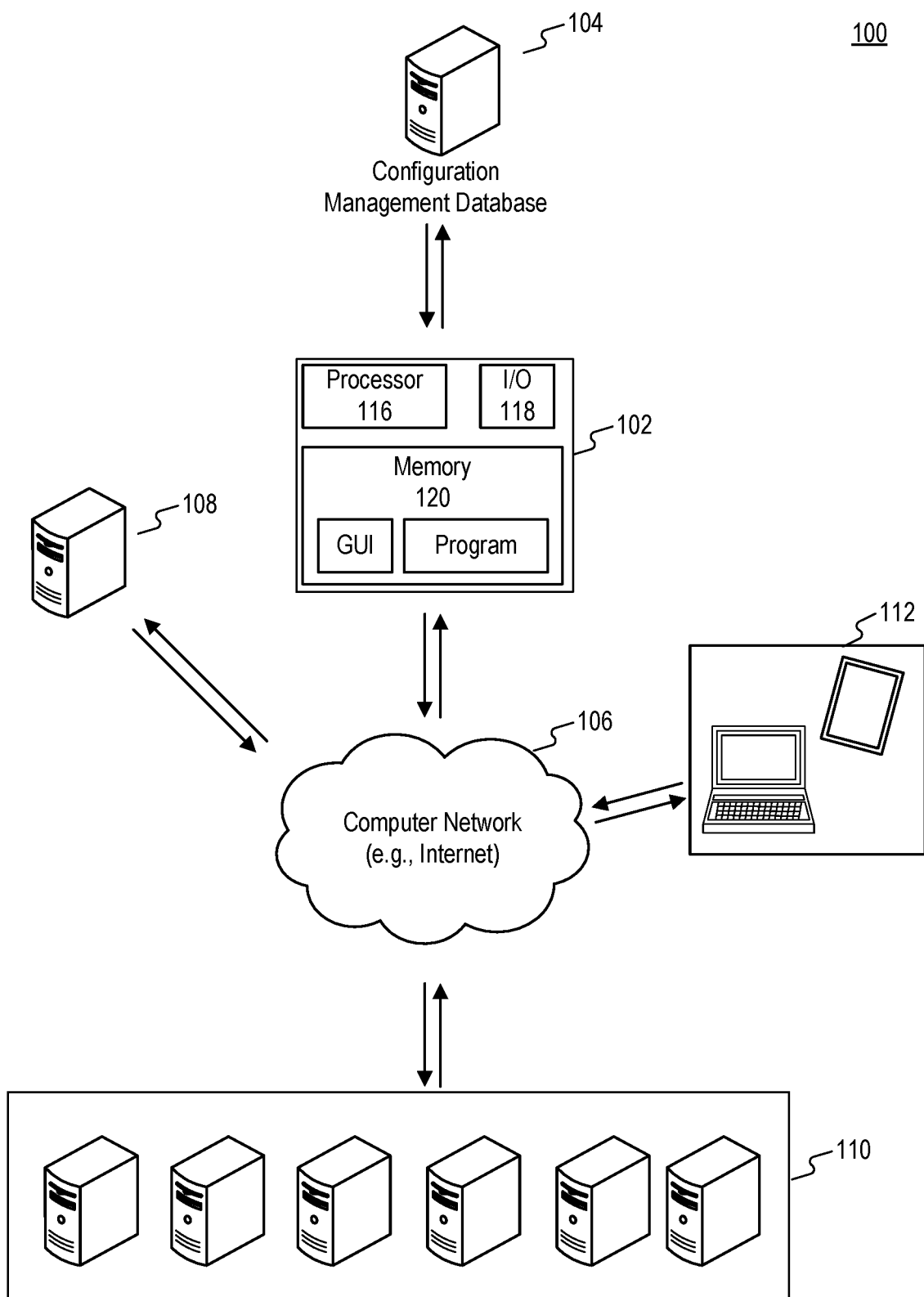
FIG. 1 illustrates a network including a client and virtual servers, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for virtual server resource usage metric grading.

FIG. 1 shows a network 100 including a virtual server resource usage metric grading system 102. System 102 includes at least one processor 116, an input/output (I/O) device that allows data to be transmitted 118, and at least one memory 120. The memory 120 stores a program for operating the IP categorization module. The memory 120 may also store instructions for a graphical user interface (GUI).

Furthermore, processor 116 may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, the memory 120 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

System 102 is connected to a configuration management database (CMDB) 104. CMDB 104 may comprise a processor, I/O device, and memory. The memory of CMDB 104 may store configuration files for initializing virtual servers, such as necessary resource allocations including processor speeds and memory, stored variables, connection parameters including ports and IP addresses. CMDB 104 also may store user requests corresponding to roles for virtual server resources. In some embodiments, system 102 may concurrently operate as CMDB 104.

System 102 is connected to a computer network 106. For example, computer network 106 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

System 102 is further connected, either directly or via computer network 106, to client device 108. Client device 108 may be a laptop, standalone computer, mobile phone, and the like. A user may send virtual server resource requests through client device 108 to system 102. In some embodiments, system 102 may include client device 108 so that a single unit receives user requests and creates and stores configuration files. Alternatively, system 102 and client device 108 may be directly connected such that information exchanged between client device 108 and system 102 need not pass over computer network 106.

Additionally, system 102 communicates with virtual server provider 110. Provider 110 may, for instance, be a service operating a plurality of servers or general purpose computers, such as a server farm, which are available for rent or purchase. In some embodiments, provider 110 may charge a user for processing time, processor capability, storage, or connectivity, such as bandwidth. Provider 110 may also charge users a set baseline for connection to virtual servers, regardless of level of use, as a retainer to guarantee future access. Provider 110 may have servers and computers of varying capabilities, and may sell systems to users while charging maintenance fees. Other arrangements selling virtual server resources by provider 110 are possible as well.

In some embodiments, customer devices 112 may connect to services hosted by virtual servers of provider 110 via network 106. For example, a company may use servers operated by provider 110 to host an e-commerce website. Customer devices 112 may then connect to the e-commerce website via network 106. In this way, customers may access a company's website without directly accessing computers owned by the company, and instead interact with virtual servers operated by provider 110. This may provide a company with the convenience of not having organic employees to operate servers, and reduce costs by only paying for the amount of computing power the company needs. Alternatively, customer devices 112 may be research collaborators, for instance, who are able to share common data stored by the virtual servers of provider 110 or computing power without operating large server farms.

Figure 2:
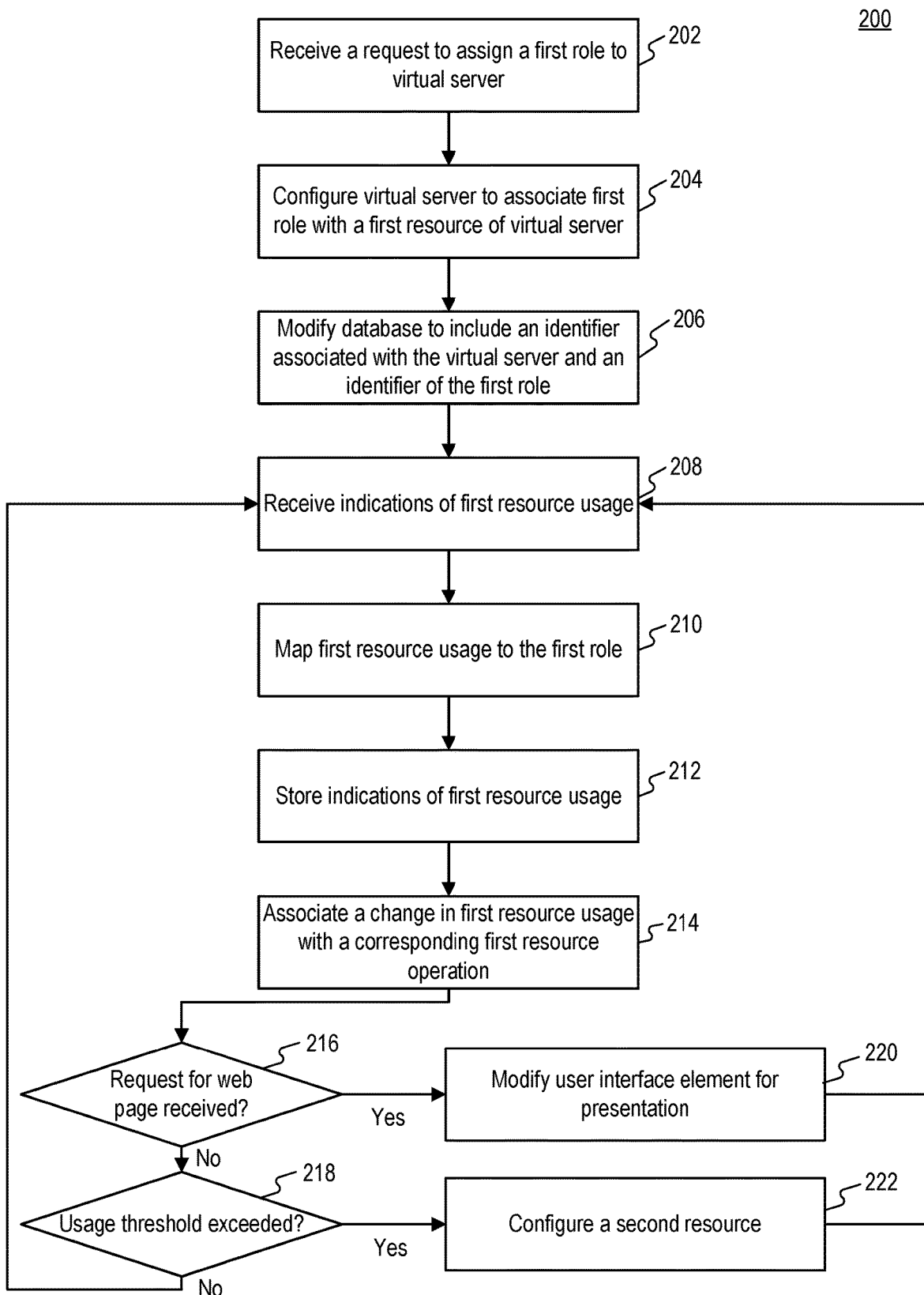
FIG. 2 is a flowchart of a live virtual server performance diagnosis process, consistent with the disclosed embodiments.

FIG. 2 shows steps of live virtual server performance diagnosis process 200. System 102 may perform process 200. For example, instructions for performing the process 200 may be stored on the memory 120 and implemented by the processor of system 102. Process 200 includes the following steps.

At step 202, system 102 receives a request to assign a first role to at least one virtual server. The request may originate from client device 108, either automatically by another process or by a user entering a request via client device 108. The first role may be, for instance, web site hosting, simulation process, or data storage. The request may specify a particular virtual server. Additionally, the request may also contain requirements such as processing time, processing power, storage, or bandwidth, for instance. Alternative, a user may initialize an operation using client device 108, and system 102 may determine the resources needed to accomplish the operation.

At step 204, system 102 configures the virtual server to associate the first role with a first resource of the virtual server. Associating a role with a resource may require system 102 (or the virtual server) to retrieve data, such as IP addresses and ports, from CMDB 104. Alternatively, software, code, initialization data or parameters, or digital assets may be copied from CMDB 104 or another storage and provided to the virtual server. System 102 may determine which resources are needed for the virtual server. The virtual server, on the other hand, may determine the needed resources based on the role contained in the request.

At step 206, system 102 modifies a database to include an identifier associated with the virtual server and an identifier of the first role assigned to the virtual server. The database may be, for instance, CMDB 104, memory 120, or stored on a virtual server. The database may record the virtual server identifier and the first role identifier in a SQL database, for example. Provider 110 may provide a unique identifier for the virtual server hosting the resource, such as an alphanumeric code, MAC address, IP address, or geophysical location including, for instance, a server warehouse location and server stack location within the warehouse. The virtual server identifier may also specify the resource of the virtual server performing the role.

At step 208, system 102 receives, from the virtual server, indications of first resource usage. The indications may be power consumption, processing duration, processor operations, bandwidth usage, storage, and the like. Further, the indications may include a cost per unit, such as cents per hour, cents per execution, or cents per floating point operation. The indications may comprise a cost per unit per time, such as cents per terabyte per month. Alternatively, cost per unit may be obtained separately from the indications of first resource usage. In some embodiments, the indications may further include information identifying the specific virtual server or account consuming the virtual server resource. System 102 may receive indications from virtual servers having high importance on a more frequent basis than low importance resources. For example, system 102 may receive indications from a virtual server providing a consumer website once every minute, but receive indications from a virtual server providing long term email archive backups once every fifteen minutes. CMDB 104 may store information regarding relative importance for use by system 102 in determining the frequency of receiving indications.

The indications may be provided by an Application Programming Interface (API) operated by provider 110 or directly by the virtual server. The API may further provide, for instance, an indication of server health. System 102 may use the Skew programming library to access the API and format relevant subsets of the data into a simplified data structure, such as a JSON file. In some embodiments, system 102 may receive indications from a plurality of APIs, such as a provider API reporting virtual server performance, and a second API performing reporting external test and validation of virtual server performance. The indications may be combined to form an overall measurement of virtual server performance. Further, the plurality of roles may all be associated with a single organization. For example, an organization may have a large number of roles using various combinations of virtual server resources, and system 102 may receive indications of resource usage for the plurality of resources serving the plurality of roles. In some embodiments, system 102 may retrieve or receive indications of resource usage for roles outside of the organization, such as publicly available metrics of virtual server resource performance. For instance, system 102 may make repeated API requests using known permutations of virtual server identifiers to establish a sample of virtual server resource performance metrics.

At step 210, system 102 maps the first resource usage to the first role. For instance, system 102 may correlate virtual server identifiers provided with the indications to virtual server identifiers stored in the database. Determining the virtual server identifier stored in the database provides the first role associated with the virtual server at step 204, allowing system 102 to map the first resource cost to the first role. System 102 may also audit the virtual server identifiers to ensure that consumed resources have a corresponding role and owner. For example, system 102 may terminate access to a resource if there is no corresponding role or role owner. System 102 may also monitor virtual server network configurations to deconflict communication protocols, accesses, and duplication.

In some embodiments, received indications do not include virtual server identifiers. System 102 may then determine virtual server identifiers by matching resource usage to other information from provider 110. For example, received indications may only contain a list of usage, such as 23 terabytes, 29 terabytes, 51 terabytes, and 81 terabytes of storage for a month. System 102 may access a provider website in an additional step to determine, for instance, which virtual server stored 23 terabytes during the month, thereby obtaining a virtual server identifier to enable mapping to the first role.

Furthermore, in some situations, system 102 may receive, from the virtual sever, indications of second resource usage. After comparing the resource usage to the database or other resources, such as provider information, system 102 may determine that the second resource is not associated with any role and terminate access to the second resource. For example, system 102 may receive indication of five hours of processing time costing $0.20 and no virtual server identifier. After analyzing the provider information, system 102 may determine that the virtual server responsible for the $0.20 charge was not attached to any role in the database and automatically terminate access to the server. As an example, system 102 may receive an indication of 2 terabytes of storage for a virtual server with identifier A623g.6. System 102 may search the database for a server having identifier A623g.6 but find no associated role, indicating, for instance, that a user had ceased the role and no longer requires the resource. System 102 may then terminate access to the second resource automatically. In some embodiments, system 102 may automatically reassign a different role to the virtual server resource having no associated role, or flag the unassociated resource for reassignment by a user.

Further, system 102 may receive or request live updates of virtual server resource usage. For example, system 102 may utilize an API to request a virtual server resource usage on short time frames, such as every minute. This may provide data with high time resolution, which allows system 102 to identify changes when they occur, rather than the changes being hidden in an average resource usage. For instance, a spike in storage usage from 1 to 100 gigabytes over a period of five minutes may be hidden in hourly data which shows the average storage usage over an hour.

At step 212, system 102 stores, in a data store, the indications of first resource usage. The data store may be at CMDB 104 a virtual server, or another system. System 102 may enable searching of the indications, for example, by organizing the indications into a SQL database, JSON file, text file, or the like, and providing the database to a search engine resource, such as Elasticsearch. System 102 may also store indications of a plurality of resource usages for comparison of usage between multiple resources. System 102 may further analyze the indications before storage, such as to determine an efficiency metric, a relative performance metric of a role in comparison to other roles, or a relative performance metric comparing present resource performance to historical averages. System 102 may further determine a baseline resource usage from the stored indications.

At step 214, system 102 associates a change in first resource usage with a corresponding first resource operation. The change may be a change in usage in comparison to a baseline. For example, if the average network usage of a virtual server over a period such as a month is 20 Mbps, system 102 may register a change in first resource usage when the network usage exceeds, for instance, 200% of the baseline. Further, using live data having high time resolution obtained in step 208, system 102 may determine when the spike occurred. System 102 may also analyze an activity log of the virtual server, or a configuration file of the virtual server containing scheduled activities, to determine a first resource operation corresponding in time to the change in first resource usage. System 102 may then identify the cause of the spike, such as a malicious user, resource intensive user activity, or misconfiguration. Without live updates and high time resolution data of virtual server performance, system 102 may be unable to determine which of many operations was the cause of a resource spike, increasing the cost of resource usage and the cost of debugging operations.

Further, system 102 may receive indications of usage of a plurality of resources associated with a plurality of roles. System 102 may also calculate an efficiency metric associated with the first role, wherein the efficiency metric is based on resource usage associated with the first role and resource usage associated with the plurality of roles. System 102 may associate a change in the efficiency metric with a corresponding first resource operation. The efficiency metric may reflect a relative performance of the first role in comparison to the performance of the other roles, or virtual server resource performance in comparison to similar virtual server resource performances across a plurality of roles. For example, the efficiency metric may comprise at least one of a CPU efficiency metric, based on CPU usage of the first role during a time period in comparison to other roles; a memory efficiency metric, based on memory usage of the first role during a time period in comparison to other roles; or a network efficiency metric, based on a number of bytes processed per unit currency during a time period in comparison to other roles. In some embodiments, a total efficiency metric based on a combination of the CPU efficiency metric, the memory efficiency metric, and the network efficiency metric may be used. The total efficiency metric may omit resources that are not employed. Further, virtual servers may be ranked against each other based on the metrics, and a grade assigned to a virtual server based on its performance compared to other virtual servers. For example, a virtual server with a network efficiency greater than 90% of other virtual servers may receive a grade of A, while a virtual server with a network efficiency less than 90% of other virtual servers may receive a grade of F.

At step 216, system 102 determines if a request for a web page displaying live server diagnostic data was received. If step 216 is YES, system 102 proceeds to step 220 and modifies a user interface element for presentation on a web page to include the first resource usage mapped to the first role and the first resource operation. System 102 further delivers the web page to a user interface for display. For example, system 102 may assemble a web page showing a line graph of network usage over time for a virtual server. The web page may also display a text box including, for instance, an excerpt of the virtual server activity log, executed code, file name, or communicant IP addresses. The text box may be located near a spike or decrease in resource usage to aid in efficient identification of a cause of a change in resource usage or efficiency.

If there was no request for the web page, step 216 is NO, and system 102 proceeds to step 218 to determine if a usage threshold has been exceeded. The usage threshold may be stored in CMDB 104, for instance. If step 218 is YES, such that the first resource operation exceeds the threshold, system 102 may configure a second resource to perform the first resource operation. This may allow system 102 to ensure continued quality of virtual server performance for users. For example, if an e-commerce company is conducting an online sale, a virtual server hosting the website may experience a sharp increase in traffic. This increase may result in slower virtual server response times and reduced consumer satisfaction. To avoid this, system 102 may automatically configure and spin up an additional virtual server to help handle the increased traffic, or may transfer the role to a server with superior capabilities. Alternatively, when traffic decreases, system 102 may determine that a resource usage or efficiency has dropped below a threshold, and transfer the corresponding role to a resource on a virtual server that is more cost efficient.

If step 216 or step 218 is NO, such that no request for the web page is received and the usage threshold is not exceeded (or, alternatively, the usage threshold is not met), system 102 may return to step 208 to receive further indications of first resource usage. Further, after modifying the website at step 220 or configuring a second resource at step 222, system 102 may return to step 208 to receive additional indications of first resource usage.

In some embodiments, system 102 may analyze performance of a virtual server as an entire unit, rather than analyzing performance of individual roles or resources associated with the virtual server. For example, system 102 may determine a total virtual server usage as a combination of indications corresponding to resources of the virtual server. System 102 may also associate a change in total virtual server usage with corresponding role operations. System 102 may then modify a second user interface element for presentation on a web page to include the total virtual server usage, a virtual server identifier, and the corresponding role operations. This may allow analysis of an entire virtual server at once to help determine which role or resource causes a degradation in virtual server performance.

For example, a first role using processing of a virtual server may experience a degradation in virtual server efficiency that is not associated with an operation of the first role. By looking at the first role in isolation, system 102 may be unable to diagnose a cause of the degradation. However, a second role may use the connectivity of the virtual server at the same time, and a spike in the second role's connectivity requirement may cause a degradation in the first role's processing efficiency. System 102 may modify an element on a display to show all of the operations occurring near the same time as the change, including the second role's connectivity operation, in association with a change in overall virtual server performance. Further, system 102 may configure a second virtual server and transfer the second role to the second virtual server in order to improve performance for both the first and second roles.

FIG. 3 illustrates an exemplary association of roles and resources of multiple virtual servers. FIG. 3 shows two organizations, sales group 302 and research and development group 304. Sales group 302 includes two roles, web hosting role 306 and email archives role 308, while research and development group 304 includes neural network training role 310.

Web hosting role 306 of sales group 302 requires processing, storage, and connectivity. As shown in FIG. 3, these three requirements may be distributed among multiple virtual servers. For instance, virtual server A 312, virtual server B 314, and virtual server C 316 provide a resource to web hosting role 306. In this way, a single role may utilize resources from a plurality of virtual servers. In some instances, a role may use the same resource type of multiple servers, as web hosting role 306 uses storage of virtual server A 312 and storage of virtual server C 316. This may occur if a single virtual server is unable to meet the needs of a role, due to device limitations or competing allocations from other roles.

Further, FIG. 3 illustrates that a virtual server may comprise a plurality of roles, each role being associated with at least one resource of the virtual server. For example, virtual server B 314 provides processing to neural network training role 310, storage to email archives role 308, and connectivity to web hosting role 306. Additionally, an individual resource may be associated with a plurality of roles. For instance, storage of virtual server A 312 is associated with web hosting role 306 and email archives role 308.

In this manner, a virtual server may comprise a plurality of roles, each role being associated with at least one resource of the virtual server. Further, at least one resource of the virtual server may be associated with a plurality of roles. This may allow users to combine multiple roles onto a single virtual server maximizing usage of virtual server resources. Also, a single role may be distributed among many different servers, thereby accessing greater resources than a single server could provide, or selecting particular resources tailored to the role but not available in a single server, such as mixing an expensive high power processor with inexpensive small storage capability. Users may thereby maximize efficiency and reduce cost.

As an exemplary embodiment of the present disclosure, a computer-implemented system for diagnosis of live virtual server performance data includes a memory storing instructions and at least one processor configured to execute the instructions. The instructions cause the system to receive a request to assign a first role to at least one virtual server; configure the virtual server to associate the first role with a storage of the virtual server; and modify a database to include an identifier associated with the virtual server and an identifier of the first role assigned to the virtual server. The system is also configured to receive, from the virtual server, indications of storage usage; map the storage usage to the first role; store, in a data store, the indications of storage usage; determine that the indications of storage usage indicate exceeding of a threshold, and responsive thereto, configure an additional storage to augment the storage of the virtual server. The system is further configured to associate a change in storage usage with a corresponding storage operation; modify a user interface element for presentation on a web page to include the storage usage mapped to the first role and the storage operation; receive a request for the web page from a user; and deliver the web page to a user interface for display.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for diagnosis of live virtual server performance data, the system comprising:
a memory storing instructions; and
at least one processor configured to execute the instructions to:
receive a request to assign a first role to at least one virtual server;
configure the at least one virtual server to associate the first role with a first resource of the at least one virtual server;
modify a database to include an identifier associated with the at least one virtual server and an identifier of the first role assigned to the at least one virtual server;
receive, from the at least one virtual server, indications of first resource usage;
map the first resource usage to the first role;
store, in a data store, the indications of first resource usage;
associate a change in first resource usage with a corresponding first resource operation;

modify a user interface element for presentation on a web page to include the first resource usage mapped to the first role and the first resource operation;
receive a request for the web page from a user; and
deliver the web page to a user interface for display.

2. The system of claim 1, wherein the instructions are further configured to cause the at least one processor to:
configure a second resource to perform the first resource operation when the first resource usage exceeds a threshold.

3. The system of claim 1, wherein the identifier associated with the at least one virtual server is an IP address.

4. The system of claim 1, wherein:
the at least one virtual server comprises a plurality of roles, each role being associated with at least one resource of the at least one virtual server; and
at least one resource of the at least one virtual server is associated with a plurality of roles.

5. The system of claim 1, wherein the indications are provided by an Application Programming Interface (API).

6. The system of claim 1, wherein the instructions are further configured to cause the at least one processor to:
receive indications of usage of a plurality of resources associated with a plurality of roles; and
calculate an efficiency metric associated with the first role, wherein the efficiency metric is based on resource usage associated with the first role and resource usage associated with the plurality of roles.

7. The system of claim 6, wherein the instructions are further configured to cause the at least one processor to:
associate a change in the efficiency metric with a corresponding first resource operation.

8. The system of claim 6, wherein the efficiency metric comprises at least one of:
a CPU efficiency metric, based on CPU usage of the first role during a time period in comparison to other roles;
a memory efficiency metric, based on memory usage of the first role during a time period in comparison to other roles; or
a network efficiency metric, based on a number of bytes processed per unit currency during a time period in comparison to other roles.

9. The system of claim 1, wherein the instructions are further configured to cause the at least one processor to:
determine a total virtual server usage as a combination of indications corresponding to resources of the at least one virtual server;
associate a change in total virtual server usage with corresponding role operations;
modify a second user interface element for presentation on a web page to include the total virtual server usage, a virtual server identifier, and the corresponding role operations.

10. The system of claim 8, wherein the efficiency metric comprises a total efficiency metric based on a combination of the CPU efficiency metric, the memory efficiency metric, and the network efficiency metric.

11. A computer-implemented method for diagnosis of live virtual server performance data, the method comprising:
receiving a request to assign a first role to at least one virtual server;
configuring the at least one virtual server to associate the first role with a first resource of the at least one virtual server;
modifying a database to include an identifier associated with the at least one virtual server and an identifier of the first role assigned to the at least one virtual server;
receiving, from the at least one virtual server, indications of first resource usage;
mapping the first resource usage to the first role;
storing, in a data store, the indications of first resource usage;
associating a change in first resource usage with a corresponding first resource operation;
modifying a user interface element for presentation on a web page to include the first resource usage mapped to the first role and the first resource operation;
receiving a request for the web page from a user; and
delivering the web page to a user interface for display.

12. The method of claim 11, further comprising:
configuring a second resource to perform the first resource operation when the first resource usage exceeds a threshold.

13. The method of claim 11, wherein the identifier associated with the at least one virtual server is an IP address.

14. The method of claim 11, wherein:
the at least one virtual server comprises a plurality of roles, each role being associated with at least one resource of the at least one virtual server; and
at least one resource of the at least one virtual server is associated with a plurality of roles.

15. The method of claim 11, wherein the indications are provided by an Application Programming Interface (API).

16. The method of claim 11, further comprising:
receiving indications of usage of a plurality of resources associated with a plurality of roles; and
calculating an efficiency metric associated with the first role, wherein the efficiency metric is based on resource usage associated with the first role and resource usage associated with the plurality of roles.

17. The method of claim 16, further comprising:
associating a change in the efficiency metric with a corresponding first resource operation.

18. The method of claim 16, wherein the efficiency metric comprises at least one of:
a CPU efficiency metric, based on CPU usage of the first role during a time period in comparison to other roles;
a memory efficiency metric, based on memory usage of the first role during a time period in comparison to other roles; or
a network efficiency metric, based on a number of bytes processed per unit currency during a time period in comparison to other roles.

19. The method of claim 11, further comprising:
determining a total virtual server usage as a combination of indications corresponding to resources of the at least one virtual server;
associating a change in total virtual server usage with corresponding role operations;
modifying a second user interface element for presentation on a web page to include the total virtual server usage, a virtual server identifier, and the corresponding role operations.

20. A computer-implemented system for diagnosis of live virtual server performance data, the system comprising:
a memory storing instructions; and
at least one processor configured to execute the instructions to:
receive a request to assign a first role to at least one virtual server;
configure the at least one virtual server to associate the first role with a storage of the at least one virtual server;

modify a database to include an identifier associated with the at least one virtual server and an identifier of the first role assigned to the at least one virtual server;
receive, from the at least one virtual server, indications of storage usage;
map the storage usage to the first role;
store, in a data store, the indications of storage usage;
determine that the indications of storage usage indicate exceeding of a threshold, and responsive thereto, configure an additional storage to augment the storage of the at least one virtual server;
associate a change in storage usage with a corresponding storage operation;
modify a user interface element for presentation on a web page to include the storage usage mapped to the first role and the storage operation;
receive a request for the web page from a user; and
deliver the web page to a user interface for display.

* * * * *